UNITED STATES PATENT OFFICE.

GADIENT ENGI, ARMIN GROB, AND FRITZ STRAUB, OF BASEL, SWITZERLAND, ASSIGNORS TO SOCIETY OF CHEMICAL INDUSTRY IN BASLE, OF BASEL, SWITZERLAND.

GREEN CHROMIUM COMPOUND AND A PROCESS OF MAKING SAME.

1,213,608.

Specification of Letters Patent.

Patented Jan. 23, 1917.

No Drawing.   Application filed November 16, 1915.   Serial No. 60,679.

*To all whom it may concern:*

Be it known that we, GADIENT ENGI, ARMIN GROB, and FRITZ STRAUB, all three chemists, citizens of the Swiss Republic, and residents of Basel, Switzerland, have invented a new Green Chromium Compound and a Process of Making Same, of which the following is a full, clear, and exact specification.

We have found that a new green chromium compound is obtained, by first separating a difficultly soluble red chromium compound from the blue solution resulting from the boiling of the technical orthooxyazo dyestuff derived from 4:2:1-nitrodiazophenol and the 1:8:3:6-aminonaphtholdisulfonic acid with chromium salts and water and by isolating from the thus obtained blue-green solution delivered from the red component the green chromium compound contained in the said solution, for instance by evaporating this latter or by precipitating the green chromium compound from the solution by an addition of common salt. This green chromium compound dissolves in water with bluish green coloration and gives on animal fibers valuable green dyeings which are purer and more blue than the dyeings obtained by subsequent chromating of the acid dyeings of the dyestuff used as parent material and are distinguished from the said dyeings by a better fastness to light, while their fastness to washing and to alkalis is very good and their fastness to fulling and to potting is sufficient.

The same green chromium compound can also be obtained in a pure state by starting from the pure orthooxyazo dyestuff derived from 4:2:1-nitroazophenol and the 1:8:3:6-aminonaphtholdisulfonic acid and by heating its solution with solutions of chromium salts. While the violet solution of the commercial dyestuff (chromium fast green G, palatine chromium green G, etc.) becomes deep-red by adding a solution of chromium fluorid and turns only after a long boiling first to violet-blue and afterward to blackblue, the likewise violet colored solution of the pure dyestuff (prepared either with pure components or by purifying the technical dyestuff according to the known process) becomes only red for a short time and turns after a short boiling at first to deep-blue and finally to a pure blue-green. The pure green chromium compound can be isolated from this solution for instance by evaporating this latter or salting the said compound out from the solution.

The preparation of the new chromium compound is illustrated by the following examples:

Example 1: 47 parts chromium fluorid are dissolved in 1100 parts hot water and to the thus obtained solution are added 50 parts of the technical dyestuff derived from 4:2:1-nitrodiazophenol and 1:8:3:6-aminonaphtholdisulfonic acid (chromium fast green G, palatine chromium green G, etc.). The mixture is boiled for 1 hour, the solution which at first was red turning progressively through blue-violet to black-blue. 120 parts crystallized sodium acetate are added to the mixture and the whole is further boiled for 1½ hours. The mass is then filtered hot and the remaining inorganic residue washed with a little quantity of water and the filtered liquid evaporated to 500 parts and let crystallize for a night, whereby the red chromium compound separates, the said compound being afterward filtered off, washed with a little quantity of a salt solution and dried. To the filtered liquid are added 150 parts common salt and the mass is allowed to stand for at least 12 hours, the green chromium-compound crystallizing thus in little needles of bronze reflex. These latter are separated by filtration, washed and dried. The thus prepared chromium compound dissolves in water with an intense bluish-green coloration which does not change neither by adding soda nor by adding soda lye. It dissolves in concentrated sulfuric acid with a blue-red coloration and in alcohol with a green coloration.

Example 2: 50 parts of the pure dyestuff derived from 4:2:1-nitrodiazophenol and 1:8:3:6-aminonaphtholdisulfonic acid are dissolved in 1100 parts of boiling water and to the solution thus obtained 47 parts of chromium fluorid are added, whereby the violet coloration of the solution turns to deep-red. After a short boiling the said coloration passes through blue to blue-green. After about 10 minutes 120 parts sodium acetate are added, whereby the coloration of the reaction mass is not changed. After a further boiling for ½ hour, whereby the coloration of the solution does not further change, the solution is separated by suction from the inorganic residue, the latter washed with a little quantity of hot water and the liquid evaporated to 500 parts. To the cooled liquid 150 parts common salt are added and the mass is allowed to stand for some time, whereby the pure chromium compound separates in form of a blue-green pulp of crystals and can be isolated with a good yielding by filtration, washing and drying. The thus prepared chromium compound has the same properties as the heretofore described.

Instead of chromium fluorid other salts of chromium, as chromium chlorid, chromium sulfate, etc., can be employed in the foregoing examples.

What we claim is:

1. The described process for the preparation of a new chromium compound consisting in heating a mixture of aqueous solutions of a chromium salt and of the technical orthooxyazo dyestuff derived from 4:2:1-nitrodiazophenol and 1:8:3:6-aminonaphtholdisulfonic acid, separating the remaining inorganic residue by filtration, evaporating the filtered blue solution, separating from this latter by crystallization a red, difficultly soluble chromium compound, delivering the solution from this latter by filtration and isolating the new green chromium compound from its remaining blue-green solution.

2. The described process for the manufacture of a green chromium compound, consisting in heating the mixture of aqueous solutions of a chromium salt and of the pure orthooxyazo dyestuff derived from 4:2:1-nitrodiazophenol and 1:8:3:6-aminonaphtholdisulfonic acid, separating the remaining inorganic residue by filtration and isolating the new chromium compound from its thus obtained solution.

3. As a new article of manufacture the described green chromium compound of the orthooxyazo dyestuff derived from 4:2:1-nitrodiazophenol and 1:8:3:6-aminonaphtholdisulfonic acid, dissolving in concentrated sulfuric acid with a red-blue coloration and in alcohol with a blue-green coloration and dyeing from its green colored aqueous solution the animal fibers green tints of prominent fastness to light.

In witness whereof we have hereunto signed our names this 19th day of October, 1915, in the presence of two subscribing witnesses.

Dr. GADIENT ENGI.
Dr. ARMIN GROB.
FRITZ STRAUB.

Witnesses:
 Arnold Zuber,
 Amand Rettey.